US011068524B2

United States Patent
Mizobuchi

(10) Patent No.: US 11,068,524 B2
(45) Date of Patent: Jul. 20, 2021

(54) COMPUTER-READABLE RECORDING MEDIUM RECORDING ANALYSIS PROGRAM, INFORMATION PROCESSING APPARATUS, AND ANALYSIS METHOD

(71) Applicant: FUJITSU LIMITED, Kawasaki (JP)

(72) Inventor: Yuji Mizobuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 16/391,634

(22) Filed: Apr. 23, 2019

(65) Prior Publication Data

US 2019/0251103 A1 Aug. 15, 2019

Related U.S. Application Data

(63) Continuation of application No. PCT/JP2016/083000, filed on Nov. 7, 2016.

(51) Int. Cl.
*G06F 17/00* (2019.01)
*G06F 16/335* (2019.01)
(Continued)

(52) U.S. Cl.
CPC ............ *G06F 16/337* (2019.01); *G06F 16/00* (2019.01); *G06F 16/313* (2019.01); *G06F 16/3344* (2019.01)

(58) Field of Classification Search
CPC ...... G06F 16/337; G06F 16/00; G06F 16/313; G06F 16/3344
See application file for complete search history.

(56) References Cited

U.S. PATENT DOCUMENTS 6,611,825 B1 * 8/2003 Billheimer ............ G06F 16/313
706/45
6,629,097 B1 * 9/2003 Keith ................. G06F 16/9558
(Continued)

FOREIGN PATENT DOCUMENTS

JP H07-334477 A 12/1995
JP 2005-208782 A 8/2005

OTHER PUBLICATIONS

J. Lilleberg, Y. Zhu and Y. Zhang, "Support vector machines and Word2vec for text classification with semantic features," 2015 IEEE 14th International Conference on Cognitive Informatics & Cognitive Computing (ICCI*CC), Beijing, pp. 136-140, doi: 10.1109/ICCI-CC.2015.7259377, Jul. 2015.*

(Continued)

*Primary Examiner* — Greta L Robinson
(74) *Attorney, Agent, or Firm* — Fujitsu Patent Center

(57) ABSTRACT

A computer-readable recording medium recording at analysis program for causing a computer to execute processing includes: measuring a diversity degree of each word included in a document which is used for learning; classifying the each word into a first word group of which the diversity degree is higher than a specified value and a second word group of which the diversity degree is lower than the specified value; learning a first distributed representation of a word included in the first word group by using a first learning algorithm to learn a distributed representation; when a word which is used by a second learning algorithm to learn the distributed representation is included in the first word group, setting a third distributed representation of the word to the second learning algorithm; and learning a second distributed representation of a word included in the second word group by using the second learning algorithm.

15 Claims, 11 Drawing Sheets

(51) Int. Cl.
  *G06F 16/00* (2019.01)
  *G06F 16/31* (2019.01)
  *G06F 16/33* (2019.01)

(56) References Cited

U.S. PATENT DOCUMENTS

2005/0071150 A1   3/2005   Nasypny et al.
2014/0229307 A1*  8/2014   Kallumadi ......... G06Q 30/0601
                                                   705/26.1

OTHER PUBLICATIONS

S. Yuan et al., "A Knowledge Resources Based Neural Network for Learning Word and Relation Representations," IEEE 17th Inter. Conference on High Performance Computing & Communications, IEEE 7th Inter. Symposium on Cyberspace Safety & Security, and IEEE 12th Int Conf. Embedded Software & Sys, Aug. 2015.*
Tomas Mikolov et al., "Efficient Estimation of Word Representations in Vector Space", In Proceedings of Workshop at ICLR, Sep. 7, 2013. (Total 12 pages).
Chang Xu et al.,"RC-NET: A General Framework for Incorporating Knowledge into Word Representations", Proceeding of the 23rd ACM International Conference on Information and knowledge Management, Nov. 3-7, 2014 in Shanghai, China. (Total 10 pages).
Yoshua Bengio et al.,"A Neural Probabilistic Language Model", Journal of Machine Learning Research 3. Feb. (2003): pp. 1137-1155 (Total 19 pages).
Qi Li et al., "Learning Word Sense Embeddings from Word Sense Definitions", arXiv:1606.04835v4 [cs.CL], Oct. 24, 2016 [online] (retrieval date: Dec. 5, 2016) Internet:<URL:http://arxiv.org/abs/1606.04835> (Total 14 pages) (Cited in ISR for PCT/JP2016/083000).
Manaal Faruqui et al., "Retrofitting Word Vectors to Semantic Lexicons", arXiv:1411.4166v4 [cs.CL] Mar. 22, 2015 [online] (retrieval date Dec. 5, 2016) Internet:<URL:http://arxiv.org/abs/1411.4166> (Total 12 pages) (Cited in ISR for PCT/JP2016/083000).
Danushka Bollegala et al.,"Joint Word Representation Learning using a Corpus and a Semantic Lexicon", arXiv:1511.06438v1 [cs.Cl] Nov. 19, 2015 [online] (retrieval date Dec. 5, 2016) Internet<URL:http://arxiv.org/abs/1511.06438> (Total 9 pages) (Cited in ISR for PCT/JP2016/083000).
International Search Report and Written Opinion of the International Searching Authority (Form PCT/ISA/210, 220, and 237), mailed in connection with PCT/JP2016/083000 and dated Dec. 20, 2016 (Total 9 pages).

* cited by examiner

COMPUTER-READABLE RECORDING MEDIUM RECORDING ANALYSIS PROGRAM, INFORMATION PROCESSING APPARATUS, AND ANALYSIS METHOD

CROSS-REFERENCE TO RELATED APPLICATION

This application is a continuation application of International Application PCT/JP2016/083000 filed on Nov. 7, 2016 and designated the U.S., the entire contents of which are incorporated herein by reference.

FIELD

The embodiment discussed herein is related to an analysis program and the like.

BACKGROUND

In sentence processing, how to acquire a highly accurate word representation is important. In Word2Vec, a word representation is acquired.

Japanese National Publication of International Patent Application No. 2005-535007, Japanese Laid-open Patent Publication No. 07-334477, Japanese Laid-open Patent Publication No, 2005-208782, Tomas Mikolov, Kai Chen, Greg Corrado, and Jeffrey Dean. "Efficient Estimation of Word Representations in Vector Space." In Proceedings of Workshop at ICLR, 2013, Xu Chang et al. "Rc-net: A general framework for incorporating knowledge into word representations." Proceeding of the 23 rd ACM International Conference on Conference on Information and Knowledge Management. ACM, 2014, and Bengio, Yoshua, et al. "A neural probabilistic language model." Journal of machine learning research 3. February, 2003: 1137-1155 are disclosed as related art.

SUMMARY

According to an aspect of the embodiments, a non-transitory computer-readable recording medium having stored therein an analysis program for causing a computer to execute processing includes: measuring a diversity degree of each word included in a document which is used for learning; classifying the each word into a first word group of which the diversity degree is higher than a specified value and a second word group of which the diversity degree is lower than the specified value; learning a first distributed representation of a word included in the first word group by using a first learning algorithm to learn a distributed representation; in a case where a word which is used by a second learning algorithm to learn the distributed representation is included in the first word group, setting a third distributed representation of the included word to the second learning algorithm; and learning a second distributed representation of a word included in the second word group by using the second learning algorithm.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The Word2Vec is a system for acquiring a distributed representation of a word based on an idea (Distribution hypothesis), such as "similar words appear in similar sentences", that is one of neural language models. The neural language model is a method for learning a distributed representation of a word by using a neural net model devised by Bengio et al. The distributed representation of the word here indicates a semantic relation of words expressed as a vector. The Word2Vec utilizes a supervised learning method of a neural network including an input layer, a hidden layer, and an output layer and learns a relation between a word that appears in a sentence, that is, a given word and surrounding words and a distributed representation of the given word. In the Word2Vec, a Continuous-Bag-of-Words model and a Skip-gram model are proposed. The Skip-gram model here is a model to which a vector corresponding to the given word is input to predict surrounding words.

Figure 6:
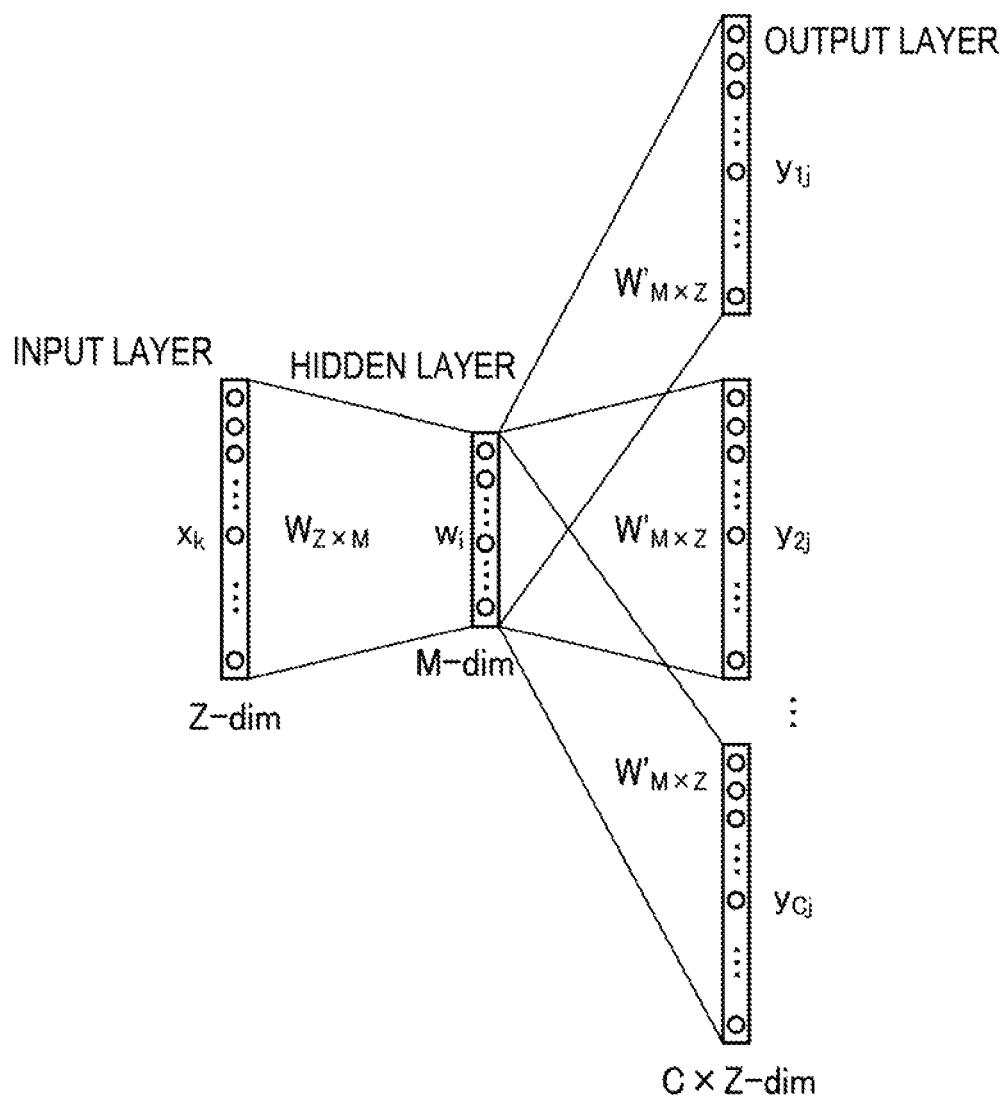
FIG. 6 is a diagram illustrating a Skip-gram model of Word2Vec.

FIG. 6 is a diagram illustrating the Skip-gram model of the Word2Vec. As illustrated in FIG. 6, a neural network including an Input layer (input layer), a Hidden layer (hidden layer), and an Output layer (output layer) is constructed with respect to the Skip-gram model.

In the input layer, a Z-dimensional input vector x corresponding to the given word that is the word that appears in the sentence is input. The input vector x is a Z-dimensional one-hot vector. The reference Z indicates the number of words in the sentence. The one-hot vector indicates a bit string such that one-hot means only one is High (1) and others are Low (0).

In the hidden layer, an M-dimensional word vector w of the given word is generated. A reference $W_{Z \times M}$ is a weight between the input layer and the hidden layer and expressed by a matrix of $Z \times M$. In the output layer, a Z-dimensional output vector $y_c$ is generated for each of C panels. The panel here is synonymous with window. The number C is the number of panels, and the reference $y_c$ is an output vector corresponding to the words provided before or after the given word. A reference W'M×Z is a weight between the hidden layer and the output layer and is expressed as a matrix of M×Z.

The skip-gram model inputs a Z-dimensional one-hot vector $x_z$ as an input vector to be input to the input layer (Input layer). Then, after mapping the input one-hot vector $x_z$ to the M-dimensional hidden layer (Hidden layer), the Skip-gram model outputs Z-dimensional output vectors corresponding to the C panels to the output layer (Output layer).

Then, in the Skip-gram model, if the output C output vectors are different from predetermined prediction vectors, weights that are parameters are updated in an order of the weight $W'_{M \times Z}$ between the hidden layer and the output layer and the weight $W_{Z \times M}$ between the input layer and the hidden layer to learn the difference. The update of the parameter is, for example, referred to as back propagation.

The word vector w of the hidden layer obtained by repeatedly learning is a distributed representation of the given word (input vector x).

Existing knowledge has been widely used to improve accuracy of the distributed representation of the word. The existing knowledge includes, for example, synonyms, antonyms, and a relation between an original form, a comparative, and a superlative in English. For example, a technique of RC-NET is learning of the distributed representation utilizing the existing knowledge. The technique of the RC-NET will be briefly described with reference to FIGS. 7 to 9.

Figure 7:
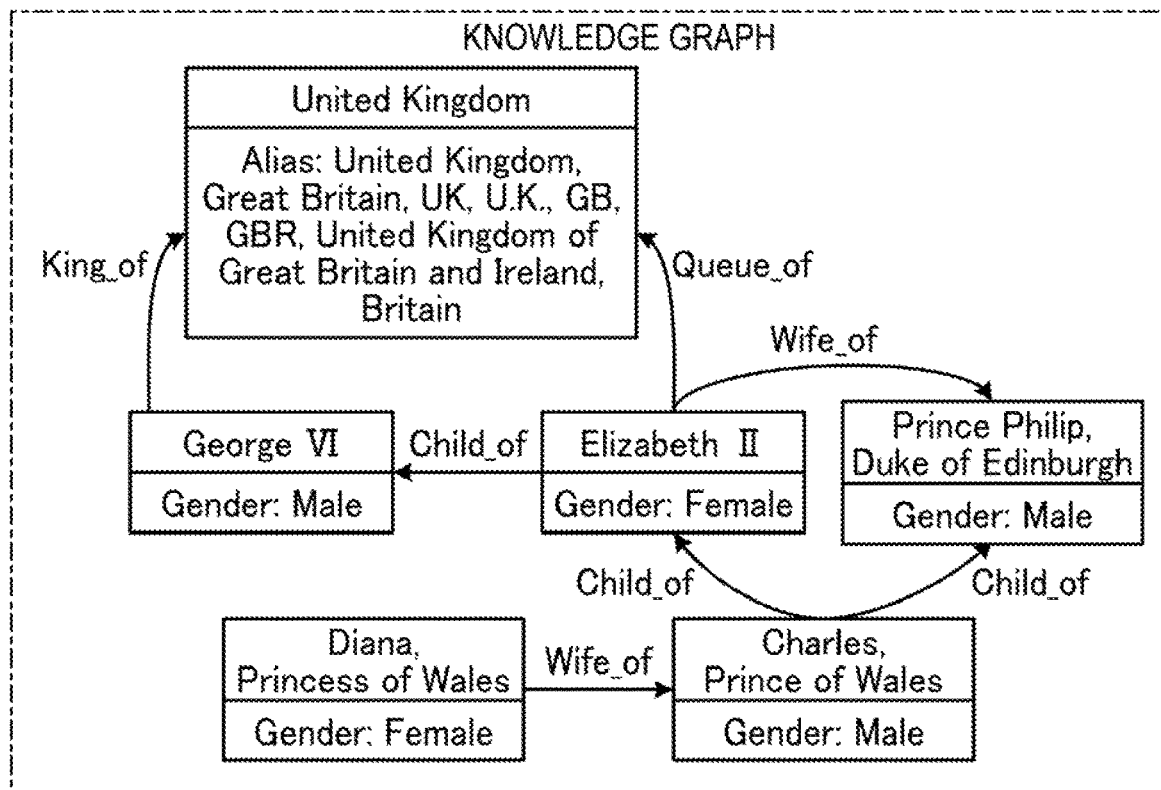
FIG. 7 is a diagram illustrating an example of knowledge used in RC-NET.

FIG. 7 is a diagram illustrating an example of knowledge used in the RC-NET. As illustrated in FIG. 7, a knowledge graph includes two knowledge types. One knowledge type is Relational Knowledge, and another one is Categorical Knowledge. For example, as the relational knowledge between words, regarding a relation with "UK", "Elizabeth II" has a relation such as Queen_of "UK". As the category knowledge of the word, the synonyms of "UK" include "Britain" and "United Kingdom".

Figure 8:
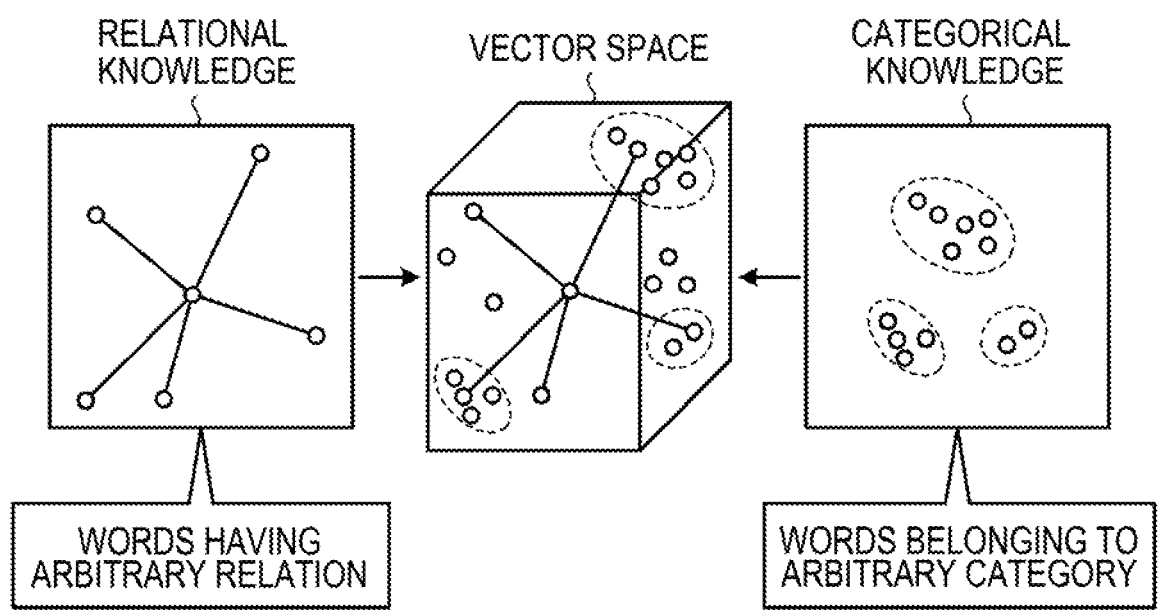
FIG. 8 is a diagram illustrating an image of a positional relation of the knowledge used in the RC-NET.

FIG. 8 is a diagram illustrating an image of a positional relation of the knowledge used in the RC-NET. As illustrated in FIG. 8, as the Relational Knowledge, two words having an arbitrary relation have a close relation to each other in terms of distance. As the Categorical Knowledge, words included in an arbitrary category are close to each other in terms of distance. The relational knowledge and the category knowledge are utilized to improve quality of a word representation.

Figure 9:
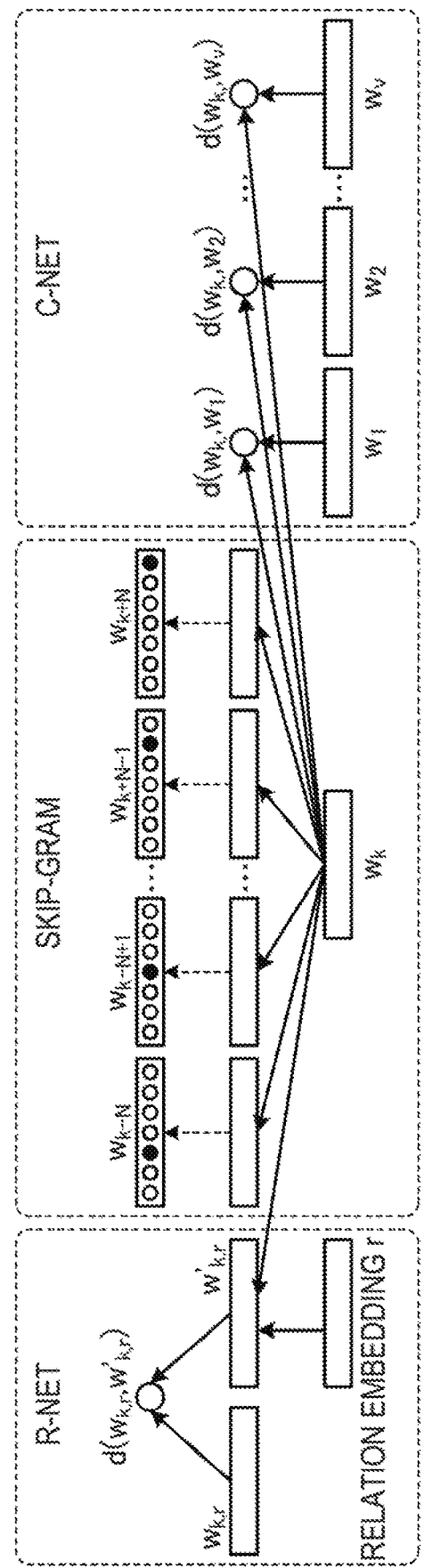
FIG. 9 is a diagram illustrating an architecture of the RC-NET.

FIG. 9 is a diagram illustrating an architecture of the RC-NET. An object of the RC-NET is to learn the representation and the relational representation of the word based on a text stream, the relational knowledge, and the category knowledge. As illustrated in FIG. 9, the RC-NET improves the quality of the word representation by utilizing the relational knowledge and the category knowledge based on the Skip-gram model. The relational knowledge here corresponds to the R-NET. The category knowledge here corresponds to the C-NET. The R-NET obtains $w'_{k,r}$ by using a distributed representation $w_k$ of a word to be learned and relation embedding (Relation embedding) r and performs learning so that the word to be learned is close to a related word $w_{k,r}$ obtained from relational knowledge in terms of distance. The C-NET performs learning so that the distributed representations $w_k$, and $w_1, w_2, \ldots, w_v$ belonging to the same category are close to each other in terms of distance. The back propagation is used for learning.

However, with the technique of the RC-NET, there is a problem in that the distributed representation of the word is not learned with high accuracy. For example, in the RC-NET, the words included in the relational knowledge and the category knowledge are used as references. Therefore, if these words are not arranged at appropriate places, learning is not appropriately performed. However, there are some cases where learning is performed without considering whether or not the distributed representations of the word included in the relational knowledge and the word included in the category knowledge are sufficiently learned. In this case, the distributed representation of the word is not learned with high accuracy.

For example, learning of a distributed representation of word may be performed with high accuracy.

Hereinafter, embodiment of an analysis program, an information processing apparatus, and an analysis method disclosed in the present application will be described in detail with reference to the drawings. The present invention is not limited to the embodiment.

Embodiment

[Configuration of Information Processing Apparatus According to Embodiment]

Figure 1:
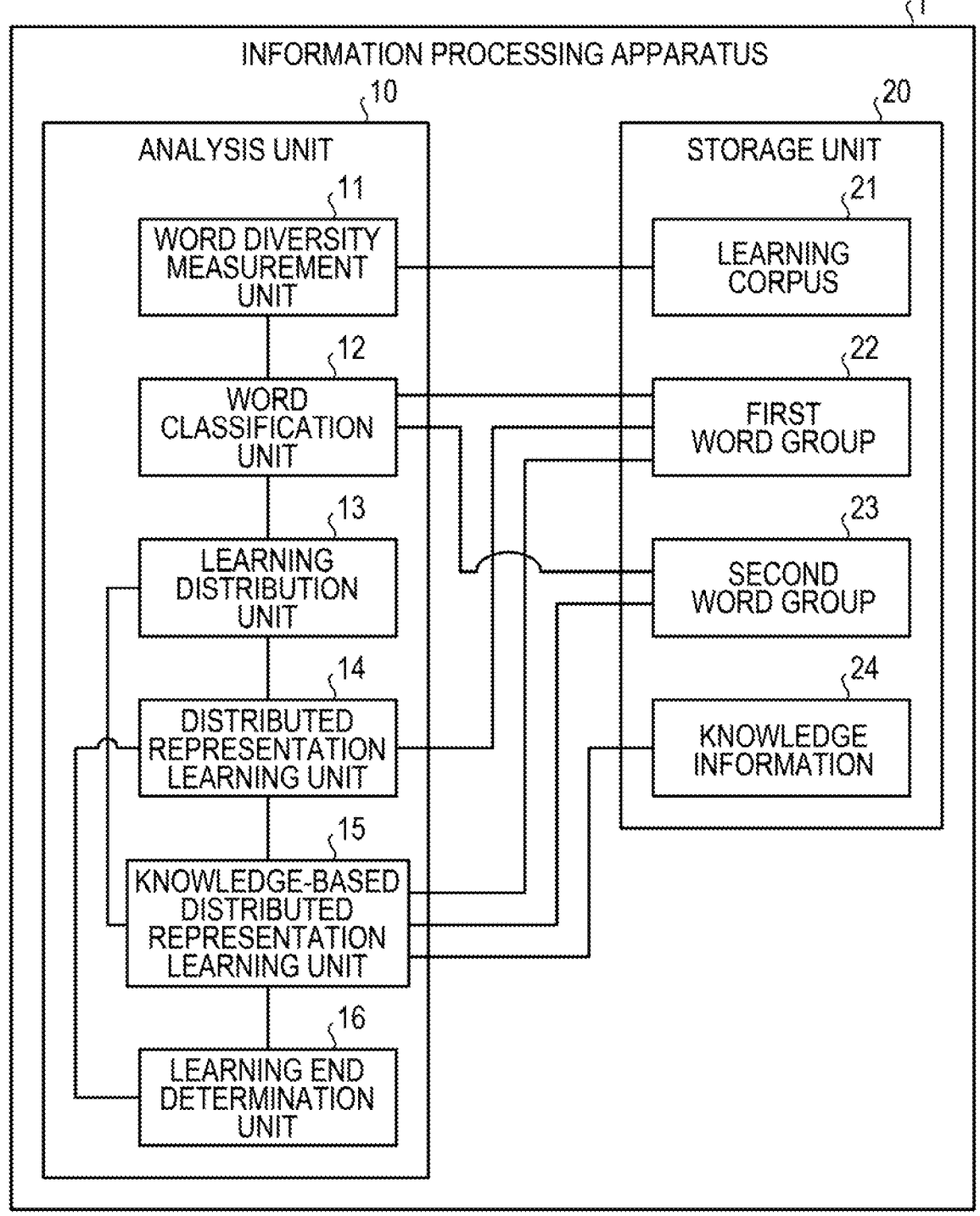
FIG. 1 is a functional block diagram illustrating a configuration of an information processing apparatus according to an embodiment.

FIG. 1 is a functional block diagram illustrating, a configuration of an information processing apparatus according to an embodiment. An information processing apparatus 1 illustrated in FIG. 1 learns distributed representations of words in consideration of diversity of words included in a document used for leaning in distributed representation learning using knowledge. The distributed representation of the word here indicates a semantic relation of words expressed as a vector. The diversity of the word here indicates that the word appears in sentences having different expressions. The sentences having different expressions indicate that words co-occur in respective sentences in which a certain word appears are different from each other. For example, when attention is paid to the certain word, a case where the word diversity is high indicates that the certain word appears in sentences having various expressions. A degree of the diversity is referred to as a diversity degree.

The information processing apparatus 1 includes an analysis unit 10 and a storage unit 20. The analysis unit 10 corresponds to an electronic circuit such as a Central Processing Unit (CPU). The analysis unit 10 includes an internal memory for storing programs defining various processing procedures and control data and executes various processing using the programs and the control data. The analysis unit 10 includes a word diversity measurement unit 11, a word classification unit 12, a learning distribution unit 13, a distributed representation learning unit 14, a knowledge-based distributed representation learning unit 15, and a learning end determination unit 16.

The storage unit 20 is, a storage device, for example, a semiconductor memory element such as a RAM and a flash memory, a hard disk, or an optical disk. The storage unit 20 includes a learning corpus 21, a first word group 22, a second word group 23, and knowledge information 24.

The learning corpus 21 is a corpus used for learning. A corpus is a group of sentences.

The first word group 22 is a group of words of which a diversity degree is higher than a specified value and is a group of words existing in a plurality of unbiased sentences. For example, the first word group 22 is a group of words sufficient for learning.

The second word group 23 is a group of words of which a diversity degree is lower than the specified value and is a group of words existing in a single or a plurality of biased sentences. For example, the second word group 23 is a group of words that are not sufficient for learning. It is sufficient that the specified value be a boundary value used when the diversity degree is determined. In a case where the diversity degree coincides with the specified value, it may be determined that the diversity degree is high or low.

The knowledge information 24 is knowledge information utilized for learning. For example, the knowledge information 24 is knowledge information used in RC-NET for learning the distributed representation of the word by utilizing the existing knowledge and includes relational knowledge information indicating information on relational knowledge and category knowledge information indicating information on category knowledge. The relational knowledge information is knowledge information used in R-NET in the RC-NET. The category knowledge information is knowledge information used in C-NET in the RC-NET. The relational knowledge information may be associated with a word and a distributed representation used in the relational knowledge in advance. The category knowledge information of the knowledge information 24 may be associated with a word and a distributed representation used in the category knowledge in advance. Learning with the RC-NET is performed by using a technique disclosed in "Xu Chang et al, "Rc-net: A general framework or incorporating knowledge into word representations"".

The word diversity measurement unit 11 measures a diversity degree of a word included in the learning corpus 21.

As a first example, regarding the word included in the learning corpus 21, the word diversity measurement unit 11 generates an appearance vector representing a relation (co-occurrence relation) indicating the word and surrounding words in a sentence in which the word appears. The co-occurrence relation here means a relation in which a certain word and another word concurrently appear in a single sentence. The word and the appearance vector are generated from the words around the word and the position of the words for each sentence. The number of words around the word coincides with a size of a panel which is a parameter used in an output layer of the Skip-gram model. Then, the word diversity measurement unit 11 measures the diversity degree of the word based on the number of kinds of appearance vectors generated for the word. For example, if the number of kinds of appearance vectors generated from the words including the word is large, it is assumed that the word exists in the plurality of unbiased sentences, and it is assumed that learning can be sufficiently performed. If the number of kinds of appearance vectors generated from the words including the word is small, it is assumed that the word exists in a single or a plurality of biased sentences, and it is assumed that learning is not sufficiently performed.

For example, it is assumed to measure a diversity degree of a word "apple". For example, the learning corpus 21 includes a sentence 1, a sentence 2, and a sentence 3. The sentence 1 is "She cut an apple with a knife", the sentence 2 is "I eat an apple", and the sentence 3 is "You eat an apple". In this case, it is assumed that a dictionary of the words include (she, cut, an, apple, with, knife, I, eat, you). In this state, if the number of panels is two, regarding the sentence 1, (0, 1, 1, 0, 1, 0, 0, 0, 0) is generated as an appearance vector representing a relation between the word "apple" and the words around the word "apple". Regarding the sentence 2 and the sentence 3, (0, 0, 1, 0, 0, 0, 0, 1, 0) is generated as the appearance vector representing the relation between the word "apple" and the words around the word "apple". Therefore, two can be obtained as the number of kinds of appearance vectors. Here, the number of kinds of the appearance vectors that is two is measured as the diversity degree of the word "apple".

As a second example, regarding the word included in the learning corpus 21, the word diversity measurement unit 11 generates an appearance vector representing a relation between the word and the words around the word in a sentence in which the word appears. The appearance vector is generated from the words around the word and the position of the words for each sentence. The number of words around the word coincides with the number of panels which is a parameter used in an output layer of the Skip-gram model. In a case where the plurality of appearance vectors generated for the word exists, the word diversity measurement unit 11 calculates average and variance of similarity between the generated appearance vectors. The similarity of the appearance vectors is calculated, for example, by using an inner product of the appearance vectors. Then, the word diversity measurement unit 11 measures the diversity degree of the word based on the average and the variance of the similarity between the appearance vectors calculated for the word. For example, if the similarity between the appearance vectors generated from the words including the word is low, the variance of the word is large, and it is estimated that the word exists in the plurality of unbiased sentences, and it is estimated that the learning can be sufficiently performed. If the similarity between the appearance vectors generated from the words including the word is high, the variance of the word is small, it is estimated that the word exists in the single or the plurality of biased sentences, and it is estimated that learning is not sufficiently performed.

For example, it is assumed to measure a diversity degree of a word "apple". As in the first example, for example, in the second example, the learning corpus 21 includes the sentence 1, the sentence 2, and the sentence 3. The sentence 1 is "She cut an apple with a knife", the sentence 2 is "I eat an apple", and the sentence 3 is "You eat an apple". In this case, it is assumed that a dictionary of the words include (she, cut, an, apple, with, knife, I, eat, you). In this state, if the number of panels is two, regarding the sentence 1, (0, 1, 1, 0, 1, 0, 0, 0, 0) is generated as an appearance vector representing a relation between the word "apple" and the words around the word "apple". Regarding the sentence 2 and the sentence 3, (0, 0, 1, 0, 0, 0, 0, 1, 0) is generated as the appearance vector representing the relation between the word "apple" and the words around the word "apple". Then, the similarity between the appearance vectors in the sentence 1 and the sentence 2 is calculated as $1/\sqrt{6}$ by using an inner product. The similarity between the appearance vectors in the sentence 1 and the sentence 3 is calculated as $1/\sqrt{6}$ by using an inner product. The similarity between the appearance vectors in the sentence 2 and the sentence 3 is calculated as one by using an inner product. Then, the average of the similarity between the appearance vectors is calculated as about 0.605 based on an expression of $(1/\sqrt{6}+1/\sqrt{6}+1)/3$. The variance of the similarity between the appearance vectors is calculated as about 0.0776. Here, in a case where the average is set as the diversity degree of the word, the average of 0.605 of the similarity between the appearance vectors is measured as the diversity degree of the word "apple". In a case where the variance is set as the diversity degree of the word, the variance of 0.0776 of the similarity between the appearance vectors is measured as the diversity degree of the word "apple".

As a third example, regarding the word included in the learning corpus 21, in a case where the word has a plurality of meanings, the word diversity measurement unit 11 corrects the measured diversity degree based on the number of meanings. This is because, in a case where a certain word has many synonyms having different meanings even though the certain word is mitten in the same way, since the diversity degree of the certain word increases too much, the exceeding diversity degree is corrected.

For example, it is assumed to measure a diversity degree of a word "apple". Under such a premise, the word "apple" has meaning of a fruit "apple" and meaning of a US company "apple" (registered trademark). Therefore, if the word has two meanings, it is estimated that the diversity degree rise twice of the diversity degree in a case where the word has a single meaning. Therefore, the exceeding diversity degree is corrected. For example, in the first example, the diversity degree is two. However, the diversity degree estimated as twice is corrected to a value of one to simply reduce the diversity degree to ½.

In this way, the word diversity measurement unit 11 can measure the diversity degree of the word.

The word classification unit 12 classifies the word of which the diversity degree has been measured into one of the first word group 22 or the second word group 23. For example, in a case where the diversity degree measured by the word diversity measurement unit 11 is higher than the specified value, the word classification unit 12 classifies the word of which the diversity degree has been measured into the first word group 22. For example, the word classification unit 12 classifies the word into the first word group 22 which is the group of the words sufficient for learning. In a case where the diversity degree measured by the word diversity measurement unit 11 is lower than the specified value, the word classification unit 12 classifies the word of which the diversity degree has been measured into the second word group 23. For example, the word classification unit 12 classifies the word into the second word group 23 which is the group of words that are not sufficient for learning.

The learning distribution unit 13 distributes the first word group 22 into distributed representation learning that does not utilize knowledge. For example, the learning distribution unit 13 outputs the first word group 22 to the distributed representation learning unit 14. In addition, the learning distribution unit 13 distributes the second word group 23 into distributed representation learning that utilizes knowledge. For example, the learning distribution unit 13 outputs the second word group 23 to the knowledge-based distributed representation learning unit 15.

The distributed representation learning unit 14 learns the distributed representation of the word included in the first word group 22 by using a technique for learning the distributed representation of the word. For example, when receiving the learning corpus 21, the distributed representation learning unit 14 learns the distributed representation of the word included in the first word group 22 by using the Skip-gram model of the Word2Vec. In addition, learning using the Skip-gram model of the Word2Vec is performed by using an existing technique. It is preferable to perform learning by using a technique disclosed in "Tomas Mikolov, Kai Chen, Greg Corrado, and Jeffrey Dean. Efficient Estimation of Word Representations in Vector Space. In Proceedings of Workshop at ICLR, 2011". Furthermore, it is preferable to perform learning by using a technique disclosed in "Xin Rong. word2vec Parameter Learning Explained".

Figure 2A:
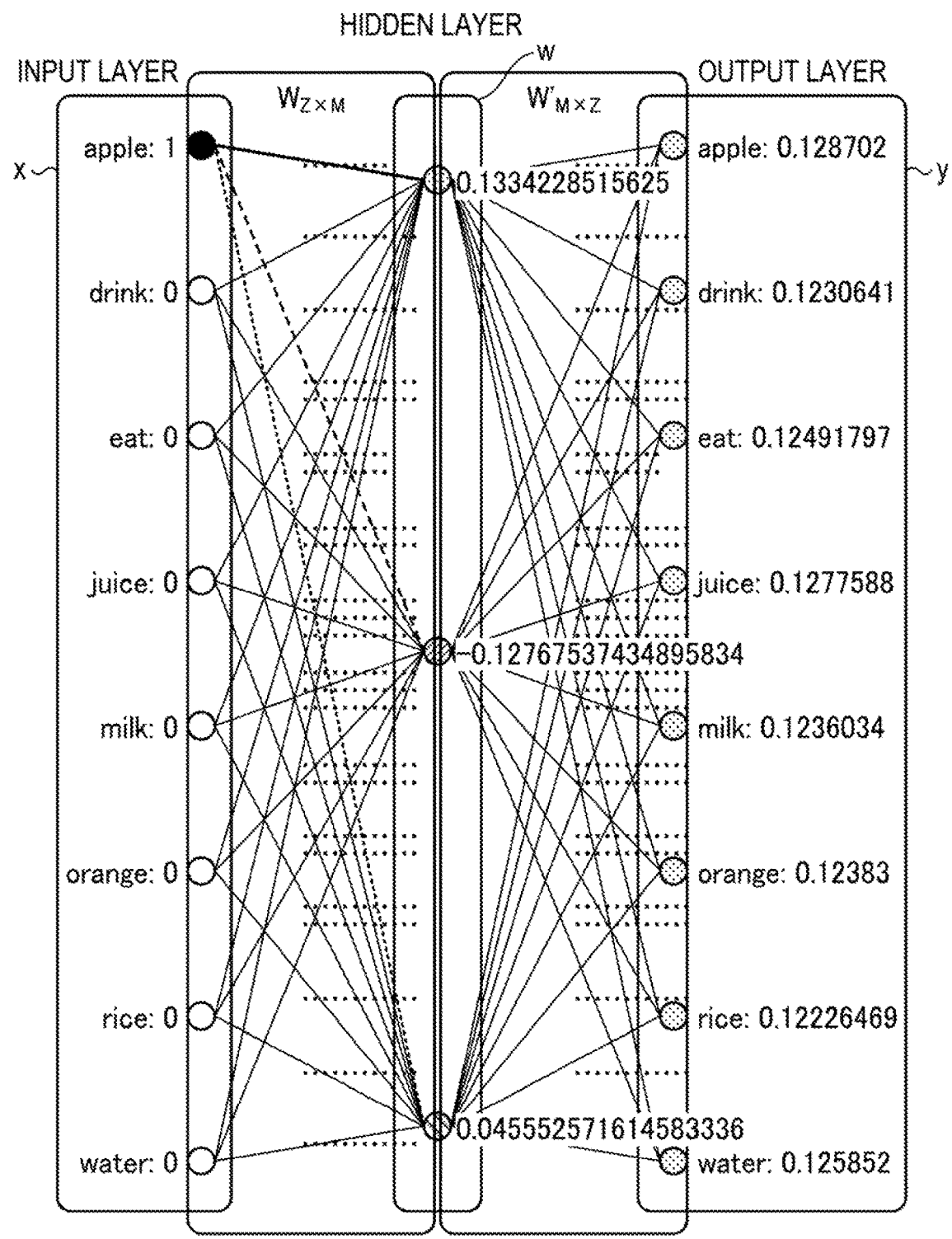
FIG. 2A is a diagram (1) illustrating an example of distributed representation learning processing according to the embodiment.
Figure 2B:
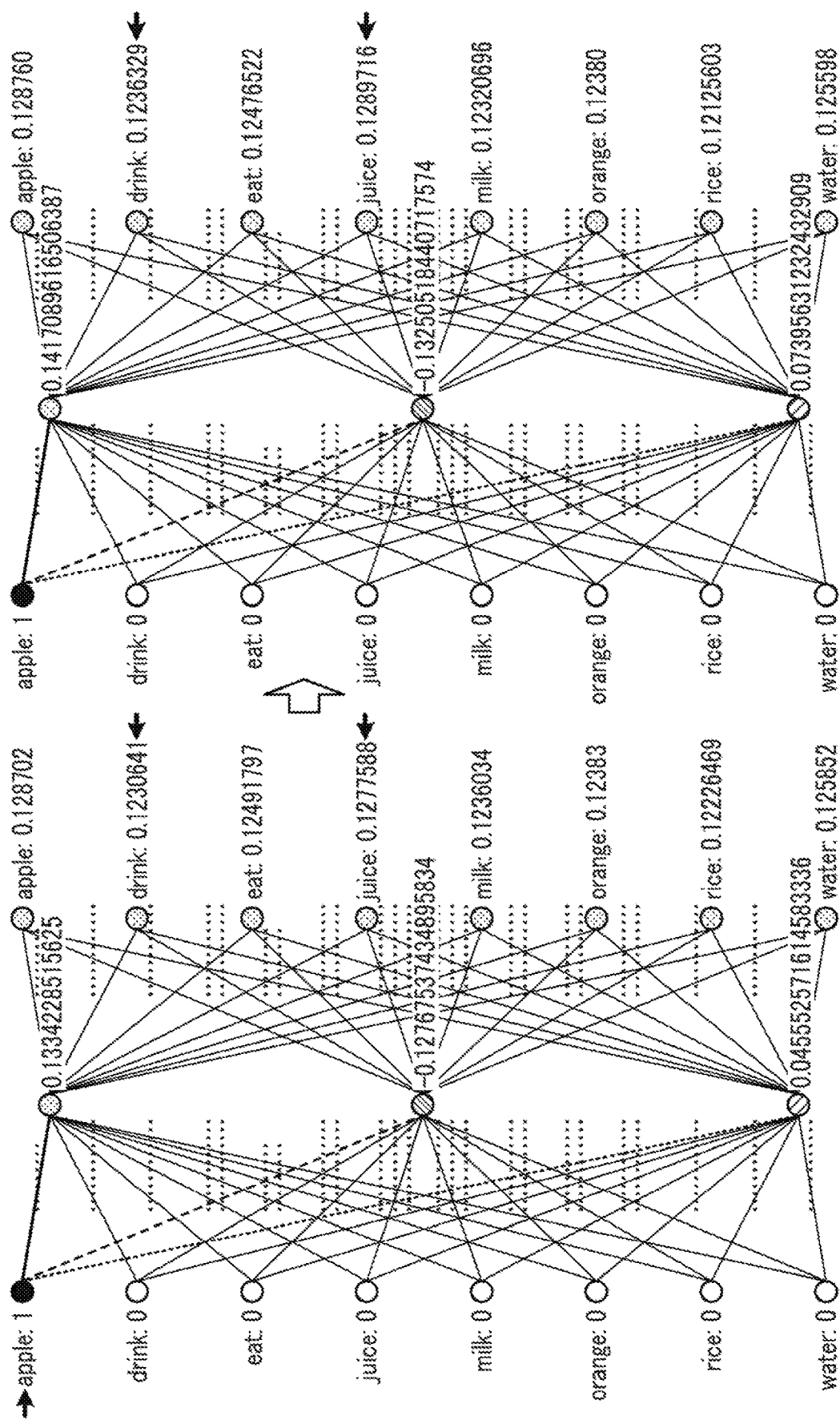
FIG. 2B is a diagram (2) illustrating an example of the distributed representation learning processing according to the embodiment.
Figure 2C:
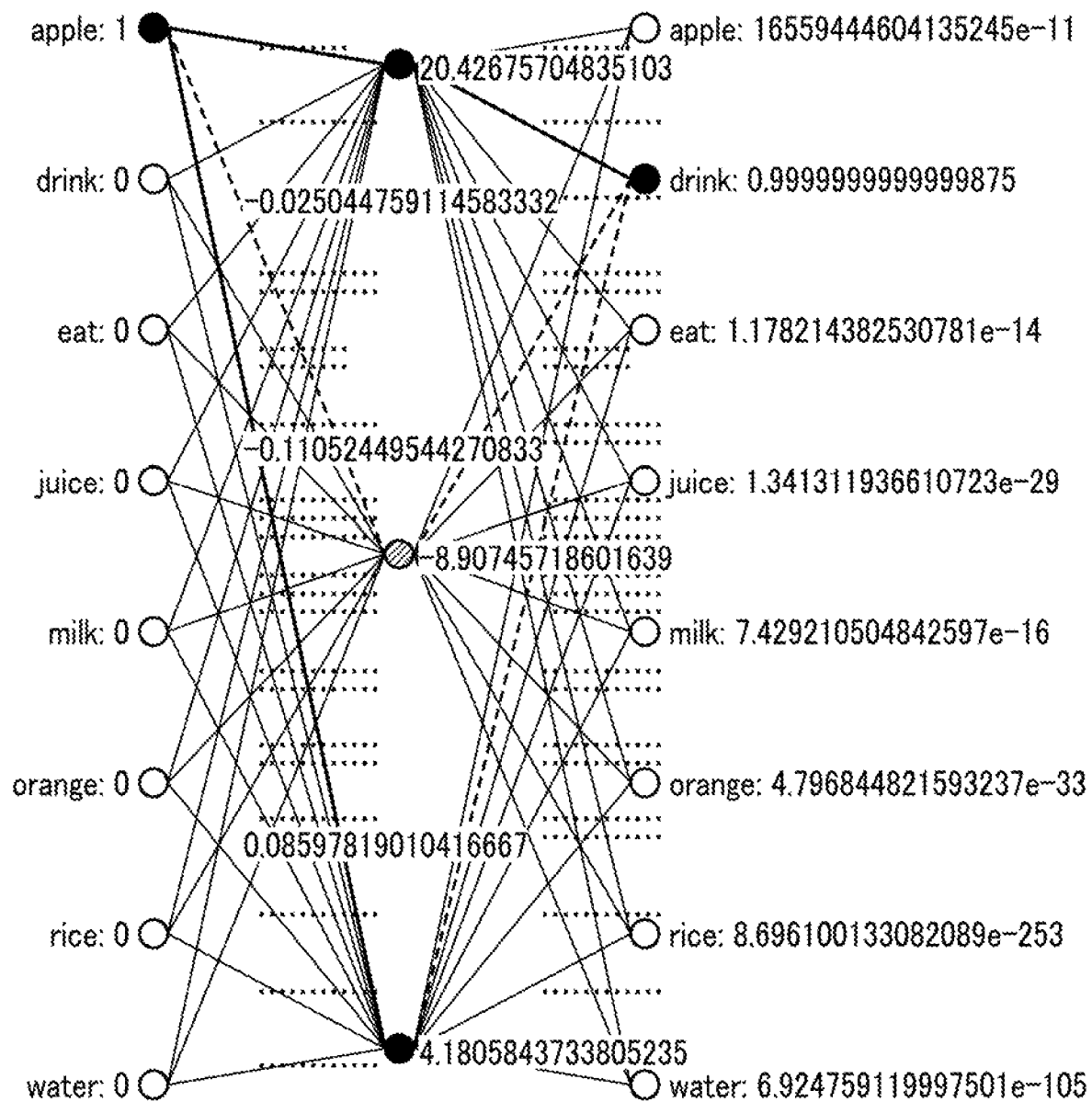
FIG. 2C is a diagram (3) illustrating an example of the distributed representation learning processing according to the embodiment.

Here, the distributed representation learning processing performed by the distributed representation learning unit 14 will be described with reference to FIGS. 2A to 2C. FIGS. 2A to 2C are diagrams illustrating an example of the distributed representation learning processing according to the embodiment. In FIGS. 2A to 2C, a technique for acquiring the distributed representation of the word will be described as the Skip-gram model of Word2Vec. It is assumed that the learning corpus 21 is "I drink apple juice . . . ".

The distributed representation learning unit 14 constructs a neural network including an Input layer (input layer), a Hidden layer (hidden layer), and an Output layer (output layer) with respect to the Skip-gram model.

First, the input layer, the hidden layer, and the output layer will be described. A Z-dimensional input vector x corresponding to a given word is input to the input layer. The input vector x is an one-hot vector. The reference Z is the number of words included in the learning corpus 21. The one-hot vector is a vector of which an element corresponding to the given word is one and other element is zero.

Furthermore, in the Hidden layer (hidden layer), finally, an M-dimensional word vector w that is the distributed representation of the given word "apple" is generated. A reference $W_{Z \times M}$ is a weight between the input layer and the hidden layer and expressed by a matrix of Z×M. As an initial state of each element of $W_{Z \times M}$, for example, a random value is given.

In the Output layer (output layer), a Z-dimensional output vector $y_c$ is generated for each of C panels (not illustrated). The number C is the predetermined number of panels, and the reference $y_c$ is an output vector corresponding to the words before or after the given word. A reference W'M×Z is a weight between the hidden layer and the output layer and is expressed as a matrix of M×Z. As an initial state of each element of $W'_{M \times Z}$, for example, a random value is given.

As illustrated in FIG. 2A, based on the Skip-gram model utilizing the neural network including the input layer, the hidden layer, and the output layer, the distributed representation learning unit 14 learns the distributed representation of the given word. For example, it is assumed that the input vector x is the one-hot vector of which an element corresponding the word in the first word group 22 and the given word "apple" in the learning corpus 21 be one and other element be zero. Then, when receiving the input vector x corresponding to the given word "apple", the distributed representation learning unit 14 generates the word vector w of the hidden layer by applying the weight of $W_{Z \times M}$ to the input vector x. Then, the distributed representation learning unit 14 generates an output vector y of the output layer by applying a weight of $W'_{M \times Z}$ to the word vector w. For example, the distributed representation earning unit 14 makes prediction by using $W_{Z \times M}$ and $W'_{M \times Z}$ in the initial state. As a result, it is predicted that a probability that the word is "drink" is 0.1230 and a probability that the word is "juice" is 0.1277.

Next, as illustrated in FIG. 2B, if the output vector y which has been actually calculated is different from a predetermined prediction vector, the distributed representation learning unit 14 updates the weights that are parameters in an order of $W'_{M \times Z}$ and $W_{Z \times M}$ based on the difference. The update of the parameters is, for example, referred to as back propagation. Then, the distributed representation learning unit 14 generates the word vector of the hidden layer by applying the updated weight of $W_{Z \times M}$ to the input vector x. Then, the distributed representation learning unit 14 generates an output vector y of the output layer by applying the updated weight of $W'_{M \times Z}$ to the word vector w. For example, the distributed representation learning unit 14 makes prediction by using the updated $W_{Z \times M}$ and $W'_{M \times Z}$. As a result, it is predicted that the probability that the word is "drink" is 0.1236 and the probability that the word is "juice" is 0.1289, and the probabilities are slightly increased from the previous prediction values.

Next, as illustrated in FIG. 2C, the distributed representation learning unit 14 repeats processing (iterate) by using a back propagation algorithm until the output vector becomes optimal. The optimal output vector is that a concurrently appearing probability of each word around the given word is maximized. For example, the appearing probabilities of the respective words around the given word are concurrently approximate to 1.0. For example, it is preferable that the distributed representation learning unit 14 repeats processing by the predetermined number of times. For example, the predetermined number of times is 500 times. However, it is preferable to obtain the optimum number of times through experiment. As a result, the distributed representation learning unit 14 acquires the word vector w that appears in the hidden layer as the distributed representation of the given word "apple".

Similarly, it is preferable that the distributed representation learning unit 14 acquire the distributed representation of the given word by switching the given word in the first word group 22.

Returning to FIG. 1, in a case where the first word group 22 is learned, the knowledge-based distributed representation learning unit 15 corrects the distributed representation of the word included in the first word group 22 by using a technique for learning the knowledge-based distributed representation of the word. For example, the technique for learning the knowledge-based distributed representation of the word is the RC-NET. For example, in a case where the word in the first word group 22 belongs to the R-NET in the RC-NET, the knowledge-based distributed representation learning unit 15 sets to use a distributed representation of a word learned by the distributed representation learning unit 14 of the belonging word in the R-NET. In a case where the word in the first word group 22 belongs to the C-NET in the RC-NET, the knowledge-based distributed representation learning unit 15 sets to use a distributed representation of a word learned by the distributed representation learning unit 14 of the belonging word in the C-NET. Then, when receiving the learning corpus 21, the knowledge-based distributed representation learning unit 15 corrects the distributed representation of the word included in the first word group 22 by using the RC-NET. As an example, regarding the word included in the first word group 22, the knowledge-based distributed representation learning unit 15 may set the distributed representation of the learned word to the word vector w of the hidden layer, set the learned weights $W_{Z \times M}$ and $W'_{M \times Z}$ as an initial state, and learn by using the RC-NET.

Furthermore, in a case where the second word group 23 is learned, the knowledge-based distributed representation learning unit 15 learns the distributed representation of the word included in the second word group 23 by using the technique for leaning the knowledge-based distributed representation of the word. For example, the technique for learning the knowledge-based distributed representation of the word is the RC-NET. For example, in a case where the word in the first word group 22 belongs to the R-NET in the RC-NET, the knowledge-based distributed representation learning unit 15 sets to use a distributed representation of a word learned by the distributed representation learning unit 14 of the belonging word in the R-NET. In a case where the word in the first word group 22 belongs to the C-NET in the RC-NET, the knowledge-based distributed representation learning unit 15 sets to use a distributed representation of a word learned by the distributed representation learning unit 14 of the belonging word in the C-NET. Then, when receiving the learning corpus 21, the knowledge-based distributed representation learning unit 15 learns the distributed representation of the word included in the second word group 23 by using the RC-NET. As an example, since there is no distributed representation of the word learned by the distributed representation learning unit 14 regarding the word included in the second word group 23, the knowledge-based distributed representation learning unit 15 learns as follows. For example, it is preferable that the knowledge-based distributed representation learning unit 15 set an one-hot vector of which the element corresponding to the word is one and other element is zero as the input vector x, set a random weight $W_{Z \times M}$ and a random weight $W'_{M \times Z}$ as initial state, and learn by using the RC-NET.

The learning end determination unit 16 determines end of learning. The learning of which the end is determined here is learning by the distributed representation learning unit 14 and learning by the knowledge-based distributed representation learning unit 15.

For example, in a case where a difference between before and after the update of the word vector w that is updated each time of learning falls below a threshold value, the learning end determination unit 16 ends learning. The word vector w before the update is a word vector after learning has been performed once. The word vector w after the update is a word vector after next learning after learning has been performed once and backpropagation has been performed. For example, an end condition of learning is expressed by Expression (1). A reference $w_{kold}$ indicates a word vector before the update of the word vector $w_k$. A reference $w_{knew}$ indicates a word vector w after the update of the word vector $w_k$. A reference k is an index indicating a kth element of a word vector in the hidden layer. A reference ε indicates a threshold value. It is sufficient that the threshold value be any value as long as the difference between before and after the update is determined to be sufficiently small based on the threshold value.

$$w_{kold} - w_{knew} < \varepsilon \qquad \text{Expression (1)}$$

Then, in a case where the difference before and after the update of the word vector w is equal to or more than the threshold value, the learning end determination unit 16 repeats learning.

It has been described that the learning end determination unit 16 sets a case where the difference between before and after the update of the word vector w falls below the threshold value as the end condition of learning. However, the present invention is not limited to this. The learning end determination unit 16 may repeat the processing by a predetermined number times of repetition (iteration).

Figure 3:
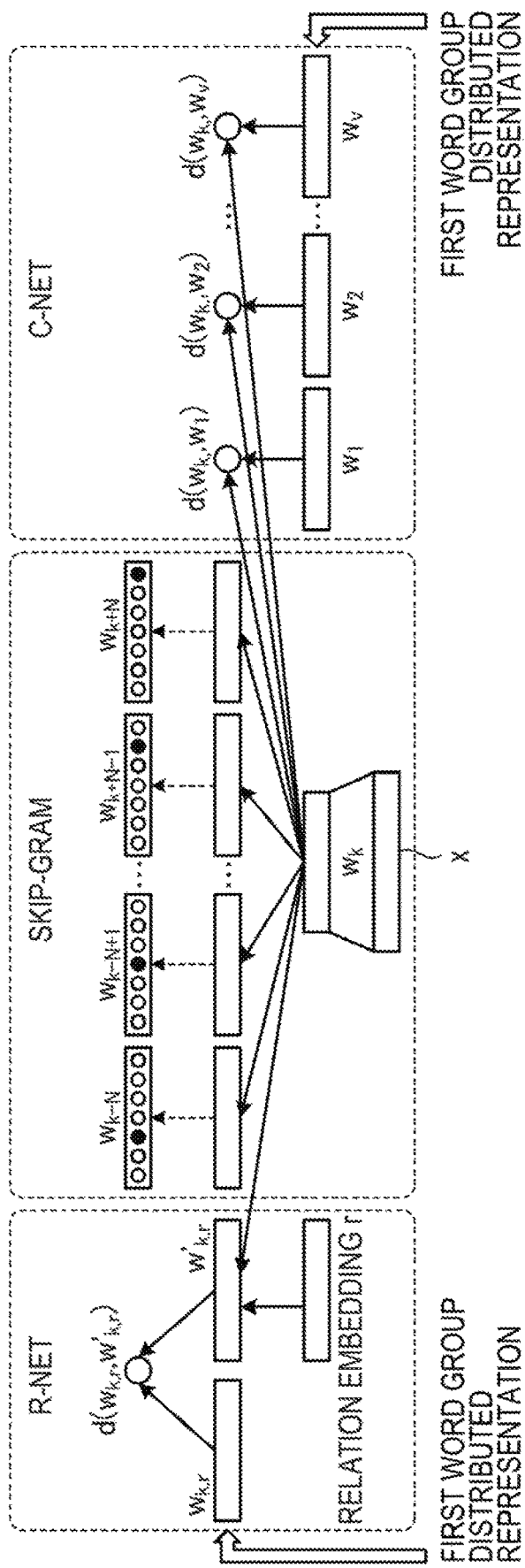
FIG. 3 is a diagram illustrating an example of knowledge-based distributed representation learning processing according to the embodiment.

Here, the knowledge-based distributed representation learning processing executed by the knowledge-based distributed representation learning unit 15 will be described with reference to FIG. 3. FIG. 3 is a diagram illustrating an example of the knowledge-based distributed representation learning processing according to the embodiment. In FIG. 3, a technique for learning the knowledge-based distributed representation of the word will be described as the RC-NET.

It is assumed that the relational knowledge information of the knowledge information 24 be associated with a distributed representation of a word used in the relational knowledge in advance. It is assumed that the category knowledge information of the knowledge information 24 be associated with a word and a distributed representation used in the category knowledge in advance.

The knowledge-based distributed representation learning unit 15 constructs a neural network obtained by extending the R-NET and the C-NET based on the Skip-gram. Since the Skip-gram has been described in the description on the distributed representation learning unit 14, the description thereof will be omitted.

First, in a case where the word in the first word group 22 belongs to the relational knowledge information of the knowledge information 24, the knowledge-based distributed representation learning unit 15 sets and associates the learned distributed representation of the word with the belonging word. In a case where the word in the first word group 22 belongs to the category knowledge information of the knowledge information 24, the knowledge-based distributed representation learning unit 15 sets and associates the learned distributed representation of the word with the belonging word Furthermore, it is assumed that, in the knowledge-based distributed representation learning unit 15, the input vector x corresponding to the given word be input to the Skip-gram. Then, the knowledge-based distributed representation learning unit 15 obtains a relation embedding r corresponding to the given word and a distributed representation $w_{k,r}$ of the related word from the knowledge information 24. As an example, in a case where the given word is "George VI", "King_of" and a distributed representation of "United Kingdom" are obtained from the relational knowledge information in the knowledge information 24 respectively as the relation embedding and the distributed representation of the related word. Here, in a case where the related word belongs to the first word group 22, the learned distributed representation is used as the distributed representation of the related word.

Then, the knowledge-based distributed representation learning unit 15 obtains $w'_{k,r}$ by using the distributed representation $w_k$ of the given word and the relation embedding r and performs learning so that the obtained $w'_{k,r}$ is close to the distributed representation $w_{k,r}$ of the related word in terms of distance. For example, the knowledge-based distributed representation learning unit 15 performs learning so that the given word is close to the related word in terms of distance. Then, if a distance d ($w_{k,r}$, $w'_{k,r}$) between the obtained $w'_{k,r}$ and the distributed representation $w_{k,r}$ of the related word is equal to or longer than a predetermined distance, the distance does not converge. Therefore, the knowledge-based distributed representation learning unit 15 updates weights W' and W that are parameters. It is preferable to use, for example, back propagation to update the parameter.

In addition, it is assumed that, in the knowledge-based distributed representation learning unit 15, the input vector x corresponding to the given word be input to the Skip-gram. Then, the knowledge-based distributed representation learning unit 15 obtains the distributed representation of the word belonging to a category same as the given word from the knowledge information 24. As an example, in a case where the given word is "George VI", distributed representations of words "Prince Philip" and "Charles" belonging to a category "Male" same as the word are obtained from the category knowledge information in the knowledge information 24. Here, in a case where the words belonging to the same category belong to the first word group 22, a learned distributed representation is used as the distributed representation of the words belonging to the same category.

Then, the knowledge-based distributed representation learning unit 15 learns the distributed representation $w_k$ of the given word and each of distributed representations $w_1$, $w_2$, ..., $w_v$ of the words belonging to the same category as the given word so that the distributed representations are close to each other in terms of distance. If any one of distances $d(w_k, w_1)$, $d(w_k, w_2)$, ..., $d(w_k, w_v)$ between the distributed representation $w_k$ and respective distributed representations $w_1$, $w_2$, ..., and $w_v$ is equal to or longer the a predetermined distance, the distance does not converge. Therefore, the knowledge-based distributed representation learning unit 15 updates the weights W' and W that are parameters. It is preferable to use, for example, back propagation to update the parameter.

In a case where a word to be learned (given word) is included in the first word group 22, it is preferable that the knowledge-based distributed representation learning unit 15 set the following to the Skip-gram of the RC-NET as an initial state. For example, the knowledge-based distributed representation learning unit 15 sets a one-hot vector of which an element corresponding to the given word is one and other element is zero as the input vector x. The knowledge-based distributed representation learning unit 15 sets a learned distributed representation $w_k$ learned by the distributed representation learning unit 14 in the hidden layer. It is preferable that the knowledge-based distributed representation learning unit 15 set the learned weights $W_{Z \times M}$ and $W'_{M \times Z}$ as weights.

In a case where a word to be learned (given word) is included the second word group 23, it is preferable that the knowledge-based distributed representation learning unit 15 set the following to the Skip-gram of the RC-NET as an initial state. For example, the knowledge-based distributed representation learning unit 15 sets a one-hot vector of which an element corresponding to the given word is one and other element is zero as the input vector x. It is preferable that the knowledge-based distributed representation learning unit 15 set the random weights $W_{Z \times M}$ and $W'_{M \times Z}$ as weights.

[Flowchart of Analysis Processing]

Figure 4:
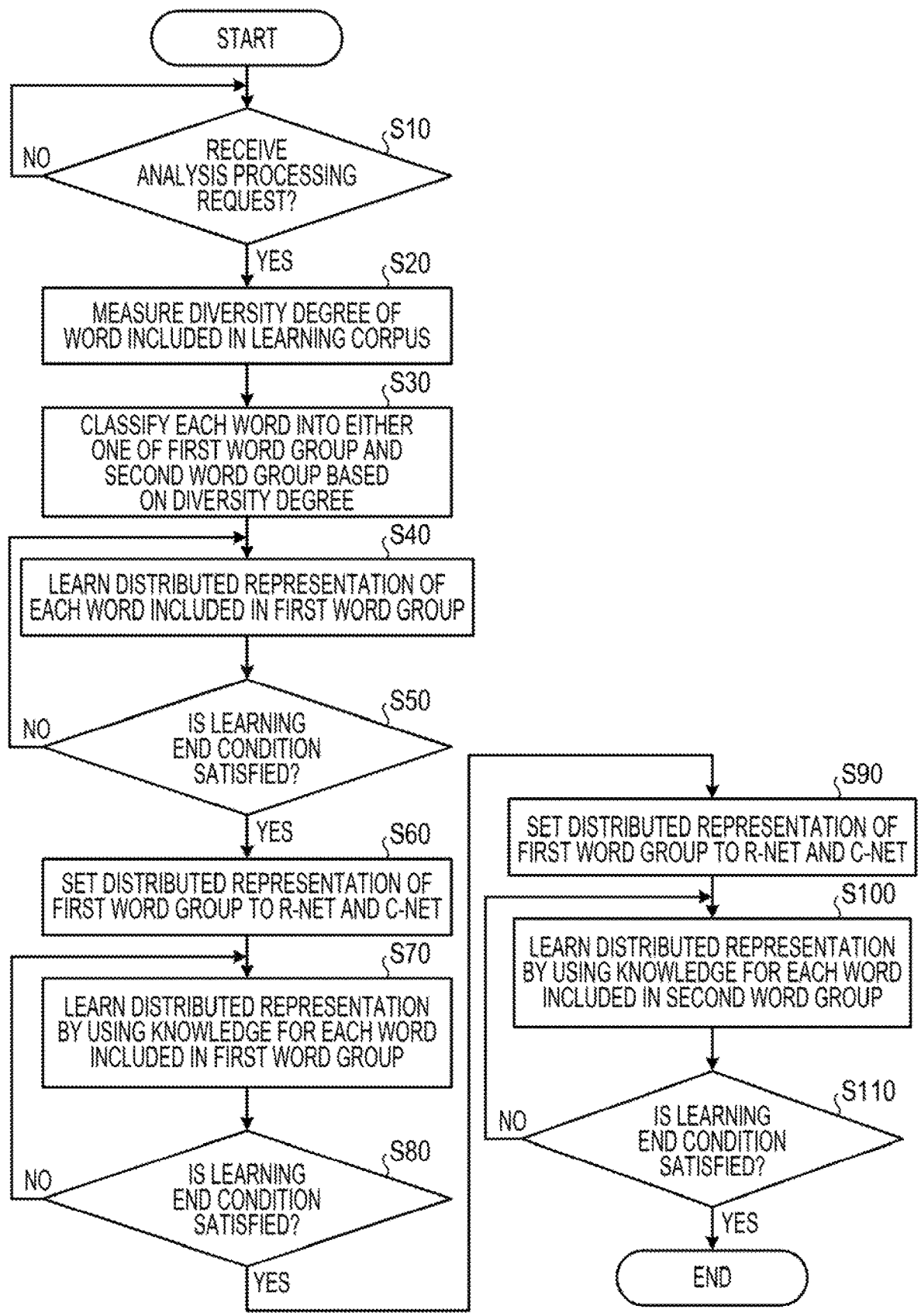
FIG. 4 is a diagram illustrating an exemplary flowchart of analysis processing according to the embodiment.

FIG. 4 is a diagram illustrating an exemplary flowchart of analysis processing according to the embodiment.

As illustrated in FIG. 4, the analysis unit 10 determines whether or not an analysis processing request has been received (step S10). When it is determined that the analysis processing request has not been received (step S10; No), the analysis unit 10 repeats determination processing until the analysis processing request is received.

On the other hand, in a case where it is determined that the analysis processing request has been received (step S10; Yes), the word diversity measurement unit 11 measures the diversity degree of the word included in the learning corpus 21 (step S20). For example, the word diversity measurement unit 11 generates appearance vectors indicating relations between the word included in the learning corpus 21 and N words ahead of the word and N words behind the word. The word diversity measurement unit 11 measures the diversity degree of the word based on the number of kinds of generated appearance vectors. Here, the reference N indicates a size of the panel that is a parameter used in the output layer of the Skip-gram model. It has been described that the word diversity measurement unit 11 uses the number of kinds of the appearance vectors of the word as the diversity degree of the word. However, the present invention is not limited to this, and the diversity degree of the word may be the average and the variance of the similarity between the appearance vectors of the word.

The word classification unit 12 classifies each word into either one of the first word group 22 and the second word group 23 based on the measured diversity degree (step S30). For example, in a case where the measured diversity degree is higher than the specified value, the word classification unit 12 classifies the word having this diversity degree into the first word group 22. In a case where the measured diversity degree is lower than the specified value, the word classification unit 12 classifies the word having this diversity degree into the second word group 23.

Then, the distributed representation learning unit 14 learns a distributed representation of each word included in the first word group 22 (step S40). For example, the distributed representation learning unit 14 learns the distributed representation of each word included in the first word group 22 by using the Skip-gram model of the Word2Vec.

Then, the learning end determination unit 16 determines whether or not a learning end condition is satisfied (step S50). For example, the learning end determination unit 16 determines whether or not the difference between the word vectors w before and after the update falls below a threshold value. The word vector w before the update indicates a word vector after earning has been performed once. The word vector w after the update is a word vector after next learning after learning has been performed once and backpropagation has been performed. In a case where it is determined that the learning end condition is not satisfied (step S50; No), the learning end determination unit 16 proceeds the procedure to step S40 to learn more.

On the other hand, in a case where it is determined that the learning end condition is satisfied (step S50; Yes), the learning end determination unit 16 proceeds the procedure to step S60 so as to shift to learning using knowledge.

In step S60, the knowledge-based distributed representation learning unit 15 sets the distributed representation of the first word group 22 to the R-NET and the C-NET of the RC-NET (step S60). For example, in a case where the word in the first word group 22 belongs to the R-NET in the RC-NET, the knowledge-based distributed representation learning unit 15 sets to use a distributed representation of a learned word of the belonging word in the R-NET. In a case where the word in the first word group 22 belongs to the C-NET in the RC-NET, the knowledge-based distributed representation learning unit 15 sets to use a distributed representation of a learned word of the belonging word in the C-NET.

Then, the knowledge-based distributed representation learning unit 15 learns the distributed representation by using the knowledge for each word included in the first word group 22 (step S70). For example, the knowledge-based distributed representation learning unit 15 further corrects the learned distributed representation of each word included in the first word group 22 by using the RC-NET.

Then, the learning end determination unit 16 determines whether or not the learning end condition is satisfied (step S80). In a case where it is determined that the learning end condition is not satisfied (step S80; No), the learning end determination unit 16 proceeds the procedure to step S70 to learn more.

On the other hand, in a case where it is determined that the earning end condition is satisfied (step S80; Yes), the learning end determination unit 16 proceeds the procedure to step S90 so as to shift to learn the second word group 23.

In step S90, the knowledge-based distributed representation learning unit 15 sets the distributed representation of the first word group 22 to the R-NET and the C-NET of the RC-NET (step S90). For example, in a case where the word in the first word group 22 belongs to the R-NET in the RC-NET, the knowledge-based distributed representation learning unit 15 sets to use a distributed representation of a learned word of the belonging word in the R-NET. In a case where the word in the first word group 22 belongs to the C-NET in the RC-NET, the knowledge-based distributed representation learning unit 15 sets to use a distributed representation of a learned word of the belonging word in the C-NET.

Then, the knowledge-based distributed representation learning unit 15 learns the distributed representation for each word included in the second word group 23 by using the knowledge (step S100). For example, the knowledge-based distributed representation learning unit 15 learns the distributed representation of each word included in the second word group 23 by using the RC-NET.

Then, the learning end determination unit 16 determines whether or not the learning end condition is satisfied (step S110). In a case where it is determined that the learning end condition is not satisfied (step S110; No), the learning end determination unit 16 proceeds the procedure to step S100 to learn more.

On the other hand, in a case where it is determined that the learning end condition is satisfied (step S110; Yes), the learning end determination unit 16 ends the analysis processing. As a result, the analysis unit 10 can learn the word in the second word group 23, that is not sufficiently learned, with high accuracy by utilizing knowledge of a relation between the words in the first word group 22 that have been sufficiently learned and the like.

With the analysis processing according to the embodiment, the meaning of the word can be interpreted by acquiring the distributed representation of the word, and it is possible to search a document and a similarity relation of sentences with high accuracy by using the distributed representation of the word. Furthermore, by applying the analysis processing according to the embodiment to a Question/Answer (Q/A) site, an appropriate answer can be searched from enormous amount of questions in the past with high accuracy by using the distributed representation of the word.

[Effect of Embodiment]

According to the embodiment, the information processing apparatus 1 measures the diversity degree of each word included in the learning corpus 21 used for learning and classifies each word into the first word group 22 of which the diversity degree is higher than the specified value and the second word group 23 of which the diversity degree is lower than the specified value. The information processing apparatus 1 learns the distributed representation of the word included in the first word group 22 by using a first learning algorithm for learning distributed representations. In a case where a word used by a second learning algorithm for learning distributed representations is included in the first word group 22, the information processing apparatus 1 sets the distributed representation of the included word to the second learning algorithm. Then the information processing apparatus 1 corrects the distributed representation of the word included in the first word group 2 by using the second learning algorithm. According to the configuration, the information processing apparatus 1 can learn the distributed representation of the word of which the diversity degree is lower than the specified value with high accuracy by utilizing the distributed representation of the word of which the diversity degree is higher than the specified value with the second learning algorithm. For example, the information processing apparatus 1 can learn the distributed representation of the word, that is not sufficiently learned, with high accuracy by utilizing the distributed representation of the word, that has been sufficiently learned, with, for example, the RC-NET that is the second learning algorithm.

Furthermore, according to the embodiment, the information processing apparatus 1 corrects the distributed representation of the word learned by using the first learning algorithm by using the second learning algorithm. According to the configuration, the information processing apparatus 1 further learns the diversity degree of the word, that has been already learned, by using the second learning algorithm utilizing the distributed representation of the word of which the diversity degree is higher than the specified value so as to learn the distributed representation of the word that has been already learned with high accuracy.

Furthermore, regarding the word included in the learning corpus 21, according to the embodiment, the information processing apparatus 1 calculates the appearance vector indicating the co-occurrence relation between the word in the sentence in which the word appears and words around the word. The information processing apparatus 1 measures the diversity degree of the word based on the number of calculated appearance vectors. Then, the information processing apparatus 1 classifies the word into the first word group 22 and the second word group 23 based on the measured diversity degree. According to the configuration, the information processing apparatus 1 can classify the word included in the learning corpus 21 according to the diversity degree based on the number of appearance vectors.

Furthermore, regarding the word included in the learning corpus 21, according to the embodiment, the information processing apparatus 1 calculates the appearance vector indicating the co-occurrence relation between the word in the sentence in which the word appears and words around the word. In a case where the plurality of calculated appearance vectors exists, the information processing apparatus 1 calculates the similarity between the appearance vectors by using the calculated appearance vectors. The information processing apparatus 1 measures the diversity degree of the word based on the calculated similarity between the appearance vectors. Then, the information processing apparatus 1 classifies the word into the first word group 22 and the second word group 23 based on the measured diversity degree. According to the configuration, the information processing apparatus 1 can classify the word included in the learning corpus 21 according to the diversity degree based on the similarity between sentences.

According to the embodiment, in a case where a plurality of meanings indicated by the word included in the learning corpus 21 is included in a predetermined dictionary, the information processing apparatus 1 corrects the measured diversity degree based on the number of meanings. According to the configuration, the information processing apparatus 1 can classify a word with high accuracy according to the diversity degree by correcting the diversity degree based on the number of meanings.

[Others]

In the embodiment, it has been described that, in the distributed representation learning utilizing the knowledge by using the RC-NET and the Skip-gram, the information processing apparatus 1 learns the distributed representation of the word in consideration of the diversity of the word included in the document used for learning. However, the RC-NET and the Skip-gram are examples, and the present invention is not limited to these. For example, the information processing apparatus 1 can be applied to a Continuous-Bag-of-Words model and a derivation of a neural language model starting from Non-Patent Document 3 instead of the Skip-gram. Furthermore, for example, the information processing apparatus 1 performs processing by using knowledge of the R-NET and knowledge of the C-NET in the RC-NET so as to reduce a distance between word vectors. However, the present invention is not limited to this, and it is possible to perform processing so that an inner product of the word vector be −1.

In addition, each component of the illustrated apparatus is not necessarily physically configured as illustrated in the drawings. For example, specific aspects of separation and integration of the apparatus are not limited to the illustrated ones, and all or a part of the apparatus can be functionally or physically separated and integrated in an arbitrary unit according to various loads and use states. For example, the knowledge-based, distributed representation learning unit 15 may be separated into a correction learning unit for correcting the distributed representation of the first word group 22 and a learning unit for learning the distributed representation of the second word group 23. Furthermore, the learning end determination unit 16 may be integrated with the distributed representation learning unit 14, and the learning end determination unit 16 may be integrated with the knowledge-based distributed representation learning unit 15. In, addition, the storage unit 20 may be connected via a network as an external device of the information processing apparatus 1.

Figure 5:
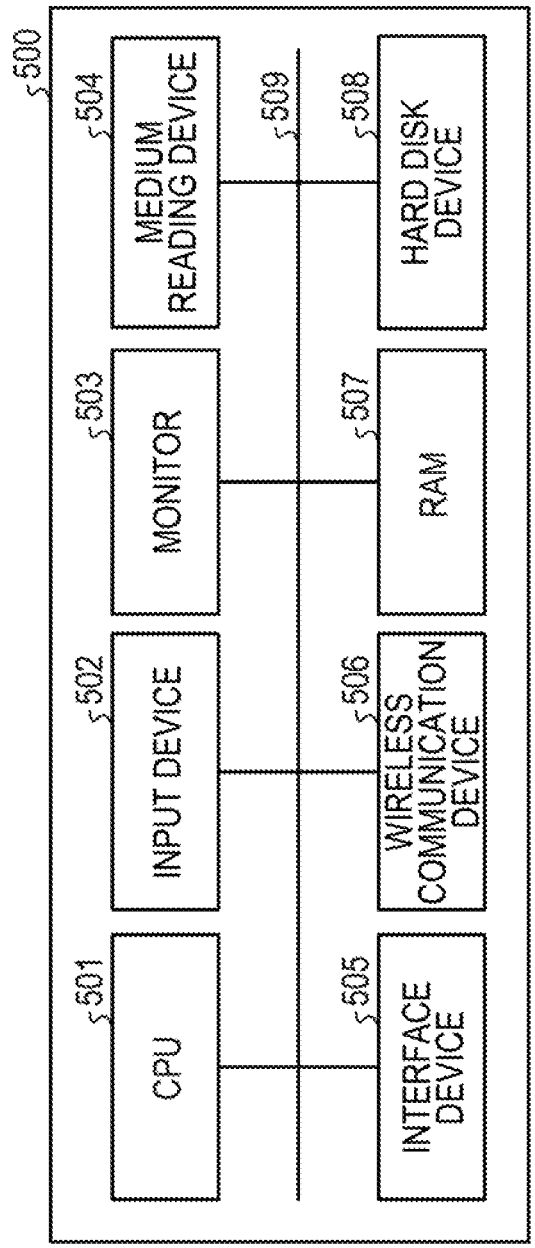
FIG. 5 is a diagram illustrating an exemplary hardware configuration of the information processing apparatus.

FIG. 5 is a diagram illustrating an exemplary hardware configuration of an information processing apparatus. As illustrated in FIG. 5, a computer 500 includes a CPU 501 for executing various calculation processing, an input device 502 for receiving data input from a user, and a monitor 503. The computer 500 further includes a medium reading device 504 for reading a program and the like from a storage medium, an interface device 505 for connecting to the other device, and a wireless communication device 506 for wirelessly connecting to the other device. The computer 500 further includes a Random Access Memory (RAM) 507 for temporarily storing various information and a hard disk device 508. Each of the devices 501 to 508 is connected to a bus 509.

The hard disk device 508 stores an analysis program having a similar function to the analysis unit 10 illustrated in FIG. 1. In addition, the hard disk device 508 stores various data for implementing the analysis program. Various data includes data in the storage unit 20 illustrated in FIG. 1.

The CPU 501 reads each program stored in the hard disk device 508 and develops and executes the program on the RAM 507 to perform various processing. These programs can make the computer 500 function as the functional units illustrated in FIG. 1.

It is not necessary for the analysis program to be stored in the hard disk device 508. For example, the computer 500 may read, and execute a program stored in a storage medium that can be read by the computer 500. The storage medium that can be read by the computer 500 corresponds to, for example, a portable recording medium such as a CD-ROM, a DVD disk, a Universal Serial Bus (USB) memory, a semiconductor memory such as a flash memory, and a hard disk drive. In addition, it is possible that these programs are stored in a device connected to a public line, the Internet, a Local Area Network (LAN), and the like and the computer 500 reads and executes these programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-recording medium having stored therein an analysis program for causing a computer to execute processing comprising:
    measuring a diversity degree of each word included in a document which is used for learning;
    classifying the each word into a first word group of which the diversity degree is higher than a specified value and a second word group of which the diversity degree is lower than the specified value;
    learning a first distributed representation of a word included in the first word group by using a first learning algorithm to learn a distributed representation;
    in a case where a word which is used by a second learning algorithm to learn the distributed representation is included in the first word group, setting a third distributed representation of the included word to the second learning algorithm; and
    learning a second distributed representation of a word included in the second word group by using the second learning algorithm.

2. The non-transitory computer-readable recording medium according to claim 1, wherein the first distributed representation is corrected by using the second learning algorithm.

3. The non-transitory computer-readable recording medium according to claim 1, wherein the classifying processing includes:
    calculating, an appearance vector indicating a co-occurrence relation between a word and surrounding words in a sentence in which the word appears regarding the word included in the document;
    measuring a diversity degree of the word based on the number of calculated appearance vectors; and
    classifying the word into the first word group and the second word group based on the measured diversity degree.

4. The non-transitory computer-readable recording medium according to claim 3, wherein in the classifying processing, in a case where a plurality of meanings indicated by the word is included in a dictionary regarding the word included in the document, the measured diversity degree is corrected based on the number of meanings.

5. The non-transitory computer-readable recording medium according to claim 1, wherein the classifying processing includes:
    calculating appearance vectors each indicating a co-occurrence relation between the word and surrounding words in a sentence in which the word appears regarding the word included in the document;
    calculating a similarity of the appearance vectors by using the calculated appearance vectors;
    measuring a diversity degree of the word based on the calculated similarity of the appearance vectors; and
    classifying the word into the first word group and the second word group based on the measured diversity degree.

6. An information processing apparatus comprising:
    a memory; and
    a processor coupled to the memory and configured to execute a process of:
    measuring a diversity degree of each word included in a document which is used for learning;
    classifying the each word into a first word group of which the diversity degree is higher than a specified value and a second word group of which the diversity degree is lower than the specified value;
    learning a first distributed representation of a word included in the first word group by using a first learning algorithm to learn a distributed representation;
    in a case where a word which is used by a second learning algorithm to learn the distributed representation is included in the first word group, setting a third distributed representation of the included word to the second learning algorithm; and
    learning a second distributed representation of a word included in the second word group by using the second learning algorithm.

7. The information processing apparatus according to claim 6, wherein the first distributed representation is corrected by using the second learning algorithm.

8. The information processing apparatus according to claim 6, wherein the processor, in the classifying processing, is configured to:
    calculate an appearance vector indicating a co-occurrence relation between a word and surrounding words in a sentence in which the word appears regarding the word included in the document;
    measure a diversity degree of the word based on the number of calculated appearance vectors; and
    classify the word into the first word group and the second word group based on the measured diversity degree.

9. The information processing apparatus according to claim 8, wherein the processor, in the classifying processing, is configured to, in a case where a plurality of meanings indicated by the word is included in a dictionary regarding the word included in the document, correct the measured diversity degree based on the number of meanings.

10. The information processing apparatus according to claim 6, wherein the processor, in the classifying processing, is configured to:
    calculate appearance vectors each indicating a co-occurrence relation between the word and surrounding words in a sentence in which the word appears regarding the word included in the document;
    calculate a similarity of the appearance vectors by using the calculated appearance vectors;
    measure a diversity degree of the word based on the calculated similarity of the appearance vectors; and
    classify the word into the first word group and the second word group based on the measured diversity degree.

11. An analysis method comprising:
    measuring, by a computer, a diversity degree of each word included in a document which is used for learning;
    classifying the each word into a first word group of which the diversity degree is higher than a specified value and a second word group of which the diversity degree is lower than the specified value;

learning a first distributed representation of a word included in he first word group by using a first learning algorithm to learn a distributed representation;

in a case where a word which is used by a second learning algorithm to learn the distributed representation is included in the first word group, setting a third distributed representation of the included word to the second learning algorithm; and learning a second distributed representation of a word included in the second word group by using the second learning algorithm.

12. The analysis method according to claim 11, wherein the first distributed representation is corrected by using the second learning algorithm.

13. The analysis method according to claim 11, wherein the classifying processing includes:

calculating an appearance vector indicating a co-occurrence relation between a word and surrounding words in a sentence in which the word appears regarding the word included in the document;

measuring a diversity degree of the word based on the number of calculated appearance vectors; and classifying the word into the first word group and the second word group based on the measured diversity degree.

14. The analysis method according to claim 13, wherein in the classifying processing, in a case where a plurality of meanings indicated by the word is included in a dictionary regarding the word included in the document, the measured diversity degree is corrected based on the number of meanings.

15. The analysis method according to claim 11, wherein the classifying processing includes:

calculating appearance vectors each indicating a co-occurrence relation between the word and surrounding words in a sentence in which the word appears regarding the word included in the document;

calculating a similarity of the appearance vectors by using the calculated appearance vectors;

measuring a diversity degree of the word based on the calculated similarity of the appearance vectors; and classifying the word into the first word group and the second word group based on the measured diversity degree.

* * * * *